US009756328B2

(12) United States Patent
Li

(10) Patent No.: US 9,756,328 B2
(45) Date of Patent: Sep. 5, 2017

(54) SYSTEM, TERMINAL, AND METHOD FOR DYNAMICALLY ADJUSTING VIDEO

(71) Applicant: Huawei Technologies Co., Ltd., Shenzhen, Guangdong (CN)

(72) Inventor: Qingliang Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 424 days.

(21) Appl. No.: 14/485,466

(22) Filed: Sep. 12, 2014

(65) Prior Publication Data

US 2015/0023403 A1    Jan. 22, 2015

Related U.S. Application Data

(63) Continuation of application No. PCT/CN2013/072063, filed on Mar. 1, 2013.

(30) Foreign Application Priority Data

Mar. 12, 2012 (CN) .......................... 2012 1 0063687

(51) Int. Cl.
*H04N 7/12* (2006.01)
*H04N 19/40* (2014.01)
*H04N 21/4402* (2011.01)
*H04N 21/485* (2011.01)
*H04N 21/432* (2011.01)

(52) U.S. Cl.
CPC ................ *H04N 19/00472* (2013.01); *H04N 21/440245* (2013.01); *H04N 21/440263* (2013.01); *H04N 21/4858* (2013.01); *H04N 21/432* (2013.01)

(58) Field of Classification Search
CPC ..... H04N 19/00472; H04N 21/440245; H04N 21/440263; H04N 21/4858; H04N 21/432
USPC ..................................................... 375/240.01
See application file for complete search history.

(56) References Cited

U.S. PATENT DOCUMENTS

| 9,113,194 | B2* | 8/2015 | Wang ............... H04N 21/23435 |
| 2007/0071097 | A1 | 3/2007 | Koto |
| 2007/0101377 | A1* | 5/2007 | Six ..................... H04N 7/17336 |
| | | | 725/86 |
| 2010/0299453 | A1 | 11/2010 | Fox et al. |
| 2012/0185610 | A1 | 7/2012 | Chen |

FOREIGN PATENT DOCUMENTS

| CN | 1558663 A | 12/2004 |
| CN | 101321280 A | 12/2008 |
| CN | 101635854 A | 1/2010 |

(Continued)

*Primary Examiner* — Allen Wong

(57) ABSTRACT

Embodiments of the present invention provide a system, a terminal, and a method for dynamically adjusting a video. The system includes: a session control unit, configured to: in a video playing process, receive operation control signaling sent by a user proxy, and generate a transcoding instruction according to the operation control signaling, where the transcoding instruction includes an updated transcoding parameter; and a transcoding unit, configured to receive the transcoding instruction sent by a session control unit, transcode, according to the updated transcoding parameter, an original video image received from a video source so as to generate a transcoded video image, and send the transcoded video image to the user proxy.

14 Claims, 7 Drawing Sheets

(56) References Cited

FOREIGN PATENT DOCUMENTS

| CN | 101848382 A | 9/2010 |
| CN | 101951493 A | 1/2011 |
| CN | 102595242 A | 7/2012 |

* cited by examiner

SYSTEM, TERMINAL, AND METHOD FOR DYNAMICALLY ADJUSTING VIDEO

CROSS-REFERENCE TO RELATED APPLICATION

This application is a continuation of International Application No. PCT/CN2013/072063, filed on Mar. 1, 2013, which claims priority to Chinese Patent Application No. 201210063687.4, filed on Mar. 12, 2012, both of which are hereby incorporated by reference in their entireties.

TECHNICAL FIELD

Embodiments of the present invention relate to the field of network communications, and in particular, to a system, a terminal, and a method for dynamically adjusting a video.

BACKGROUND

In video playing, a symptom that an original video cannot be smoothly decoded or played due to high resolution of the original video and low performance of a user proxy often appears. In addition, if a screen of the user proxy is small and the resolution is low, even if the original video can be decoded smoothly, when finally presented, the decoded image also cannot be presented in the original high resolution due to the restriction of the resolution of the screen. Consequently, visual experience of a high-resolution video is poor and computing resources are wasted.

In a case in which the screen resolution is fixed, using a streaming media server or an image server to transfer a high-resolution video or image causes a waste in network bandwidth or storage space. However, if a low-resolution video is transferred, a mosaic symptom also appears when the video is played, or in particular, enlarged, and therefore viewing of details of pictures is affected.

To solve this problem, a transcoding unit is added between a video source and the user proxy. The transcoding unit transcodes the original video and provides a video in a video format or a resolution that can be supported by the user proxy. Transcoding refers to a process of converting one video coding format to another video coding format, a process of enlarging/reducing a video resolution to another video resolution, or a process in which the preceding two processes are performed at the same time. For example, the transcoding unit may convert an H264-encoding high-definition video into a CIF (Common Intermediate Format; common intermediate format) resolution MPEG (Moving Pictures Experts Group, moving pictures experts group)-4 format video that can be viewed on a mobile phone.

However, the video processed by the transcoding unit may not necessarily meet user requirements. For example, when a user needs to enlarge a video playback window on the user proxy, the user can only enlarge a picture on the user proxy locally, which is likely to result in symptoms such as mosaic. A conventional transcoding unit cannot dynamically adjust videos according to user requirements and operation is not flexible.

SUMMARY

Embodiments of the present invention provide a system, a terminal, and a method for dynamically adjusting a video, which can improve operational flexibility of dynamic video adjustment.

According to one aspect, a system for dynamically adjusting a video is provided, including: a session control unit, configured to: in a video playing process, receive operation control signaling sent by a user proxy, and generate a transcoding instruction according to the operation control signaling, where the transcoding instruction includes an updated transcoding parameter; and a transcoding unit, configured to receive the transcoding instruction sent by the session control unit, transcode, according to the updated transcoding parameter, an original video image received from a video source so as to generate a transcoded video image, and send the transcoded video images to the user proxy.

According to another aspect, a terminal for dynamically adjusting a video is provided, including: a playing module, configured to play a video image received from a transcoding unit; a generating module, configured to generate operation control signaling in a video playing process, where the operation control signaling includes an operation type of an operation executed on the video image or includes the operation type of the operation and an operation parameter; a sending module, configured to send the operation control signaling to the session control unit, so that the session control unit generates a transcoding instruction according to operation control signaling and sends the transcoding instruction to the transcoding unit, where the transcoding instruction includes an updated transcoding parameter, so that the transcoding unit transcodes, according to the updated transcoding parameter, an original video image received from a video source so as to generate a transcoded video image; and a receiving unit, configured to receive the transcoded video image from the transcoding unit, where the playing module is further configured to play the transcoded video image.

According to another aspect, a method for dynamically adjusting a video is provided, including: in a video playing process, receiving operation control signaling sent by a user proxy, and generating a transcoding instruction according to the operation control signaling, where the transcoding instruction includes an updated transcoding parameter; and sending the transcoding instruction to a transcoding unit, so that the transcoding unit transcodes, according to the updated transcoding parameter, an original video image received from a video source so as to generate a transcoded video image, and sends the transcoded video images to the user proxy.

According to another aspect, a method for dynamically adjusting a video is provided, including: playing a video image received from a transcoding unit; generating operation control signaling in a video playing process, where the operation control signaling includes an operation type of an operation executed on the video image or includes the operation type of the operation and an operation parameter; sending the operation control signaling to a session control unit, so that the session control unit generates a transcoding instruction according to the operation control signaling and sends the transcoding instruction to the transcoding unit, where the transcoding instruction includes an updated transcoding parameter, so that the transcoding unit transcodes, according to the updated transcoding parameter, an original video image received from a video source so as to generate a transcoded video image; and receiving the transcoded video image from the transcoding unit, and playing the transcoded video image.

In the embodiments of the present invention, a session control unit generates a transcoding instruction according to operation control signaling of a user proxy, so that a transcoding unit dynamically updates a transcoding parameter, thereby implementing dynamic transcoding on an original video as required, and improving operational flexibility of dynamic video adjustment.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 11A and FIG. 11B show examples in which a video is partially zoomed in.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
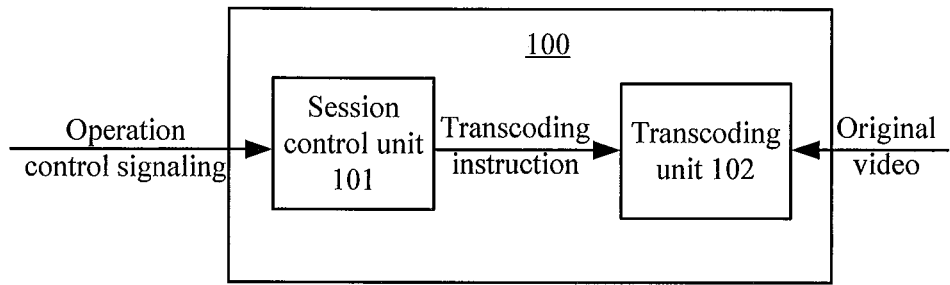
FIG. 1 is a block diagram of a system for dynamically adjusting a video according to an embodiment of the present invention.

FIG. 1 is a block diagram of a system for dynamically adjusting a video according to an embodiment of the present invention. A system 100 in FIG. 1 includes a session control unit 101 and a transcoding unit 102.

In a video playing process, the session control unit 101 receives operation control signaling sent by a user proxy, and generates a transcoding instruction according to the operation control signaling, where the transcoding instruction includes an updated transcoding parameter.

The transcoding unit 102 receives the transcoding instruction sent by the session control unit 101, transcodes, according to the updated transcoding parameter, an original video image received from a video source so as to generate a transcoded video image, and sends the transcoded video image to a user proxy.

In the embodiment of the present invention, a session control unit generates a transcoding instruction according to operation control signaling of a user proxy, so that a transcoding unit dynamically updates a transcoding parameter, thereby implementing dynamic transcoding on an original video as required, and improving operational flexibility of dynamic video adjustment.

It should be understood that in the embodiment of the present invention, the user proxy may be a device in a form of software or in a form of hardware on a terminal side such as a player and a decoder. For example, the user proxy may be a software player, an MP4 player, a decoding card, or a cloud computing client. This is not limited in the embodiment of the present invention.

It should be understood that in the embodiment of the present invention, the session control unit 101 is added between the user proxy and the transcoding unit to implement dynamic video adjustment. The session control unit 101 may be in a form of either software or hardware, which is not limited in the embodiment of the present invention. In addition, the session control unit 101 may be integrated with the user proxy (for example, integrated into a terminal), or used as a module of the user proxy. It may also be used as a stand-alone network element on a network side, or integrated with the transcoding unit 101 (for example, integrated on a streaming media server). This is not limited in the embodiment of the present invention.

A conventional transcoding unit can transcode only a complete video, and therefore can send only the complete video to the user proxy. In this case, if a user only needs to view part of a video, the transcoding unit still needs to process the complete video and send the complete video to the user proxy. This wastes computing resources of the transcoding unit and occupies network resources.

The transcoding parameter of the transcoding unit 102 in the embodiment of the present invention may be flexibly updated and only a part of the video may be processed, thereby saving the computing resources of the transcoding unit 102. For example, if the user needs to enlarge a part of a video image, the transcoding unit 102 may process only the part of the video image and does not process other parts other than the part of the video image, thereby saving the computing resources.

In addition, the transcoding unit 102 in the embodiment of the present invention transmits only the transcoded video image but does not need to transmit the complete video, thereby saving the network resources. For example, if the user needs to superimpose a smaller image B over image A, the transcoding unit 102 may not process a part of image A that is blocked by image B, thereby saving the computing resources. Meanwhile, the transcoding unit 102 may not transmit the part of image A that is blocked by image B, thereby saving the network resources.

If the conventional terminal needs to process a video image on a local playback window, such as zooming in or out the video image on a local playback window, the computing resources, such as coding and decoding, of the user proxy on the terminal need to be occupied. The transcoding unit 101 in the embodiment of the present invention is responsible for transcoding of the video image, and local adjustment processing by the user proxy is not required, thereby saving the computing resource of the terminal.

Optionally, in an embodiment, the session control unit 101 computes the updated transcoding parameter according to an operation type included in the operation control signaling or according to an operation type and an operation parameter that are included in the operation control signaling, and generates a transcoding instruction that includes the updated transcoding parameter.

The operation control signaling is used to indicate an operation executed on the video image. The user proxy may generate the operation control signaling according to the operation performed by the user on the video image in the video playing process; alternatively, the operation control signaling may be preset, and triggered by a system as scheduled or triggered by an event. For example, the operation control signaling may include the operation type (such as Zoom, Move, and Fill) of the operation, or include the operation type of the operation and an operation parameter (if any operation parameter exists). The following further describes in detail examples of some operation types and corresponding operation parameters (if the operation type has any operation parameter) that are included in the operation control signaling with reference to an embodiment of Table 1. However, it should be noted that the embodiment of Table 1 is only exemplary and does not limit the scope of the embodiment of the present invention.

For example, in a case in which the user proxy is implemented by software, a user may configure an operation on the video picture, such as Zoom, Move, or Part Zoom, by using a mouse, a keyboard, a touch screen, or a handwriting pen, to operate a button, a menu, or a screen of the software. In another aspect, in a case in which the user proxy is implemented by hardware, the user may configure an operation on the video picture, such as Zoom, Move, or Part Zoom, by using a remote controller, a key, an intelligent sensing input device, or an operation decoder. The user proxy generates corresponding operation control signaling so as to indicate the operation. The following further describes in more details examples of operations performed on a video image with reference to a specific embodiment. However, the embodiment of the present invention is not limited to these specific examples, and the exemplified operations may be added, deleted, or replaced as required. For example, some even more complicated operations (such as superimposing of multiple partial videos or superimposing of one or more partial videos over a complete video) and corresponding parameters may be added. All these modifications shall fall within the scope of the embodiment of the present invention.

Optionally, in another embodiment, the foregoing updated transcoding parameter may include a position parameter of a partial video image. The transcoding unit 102 may capture the partial video image from the original video image according to the position parameter of the partial video image, and transcode the partial video image so as to generate a transcoded video image. The position parameter of a partial video image is used to indicate a position of the partial video image on a playback window or an original video image, for example, it may indicate coordinates of a start point (for example, but not limited to, a point in an upper right corner) of the partial video image on the playback window or the original video image. However, the embodiment of the present invention does not limit a specific form of the position parameter of the partial video image; for example, the position parameter may be in a vector form, or the position parameter of the partial video image may further include other information, such as a width and a height of the partial video image, and coordinates of other points (such as points in the lower right corner) of the partial video image. All these changes shall fall within the scope of the embodiment of the present invention. In this way, the embodiment of the present invention can implement a function of capturing the partial video image.

Optionally, in another embodiment, the foregoing updated transcoding parameter may further include a scale parameter of the partial video image. The transcoding unit 102 may zoom in or out the captured partial video image according to the scale parameter of the partial video image, and transcode the zoomed-in/out partial video image so as to generate a transcoded video image. The scale parameter of the partial video image indicates a scale for zooming in or out the partial video image. It may be a scale value relative to the partial video image or a scale value relative to the original video image, for example, the scale parameter may include a width zoom scale and a height zoom scale. However, the embodiment of the present invention does not limit a specific form of the scale parameter of the partial video image; for example, the scale parameter may be a scale value when a width to height ratio is fixed. All these changes shall fall within the scope of the embodiment of the present invention. In this way, the embodiment of the present invention can implement a function of zooming in or out the partial video image.

Optionally, in another embodiment, the transcoding unit 102 may superimpose the zoomed-in/out partial video image over the original video image, and transcode the superimposed video image so as to generate a transcoded video image. In this way, the embodiment of the present invention can implement a function of superimposing the video image.

It should be noted that the embodiment of the present invention does not limit the number of partial video images. For example, zoomed-in/out images of two or more partial video images can be superimposed onto an original video image. All these changes shall fall within the scope of the embodiment of the present invention.

Figure 2:
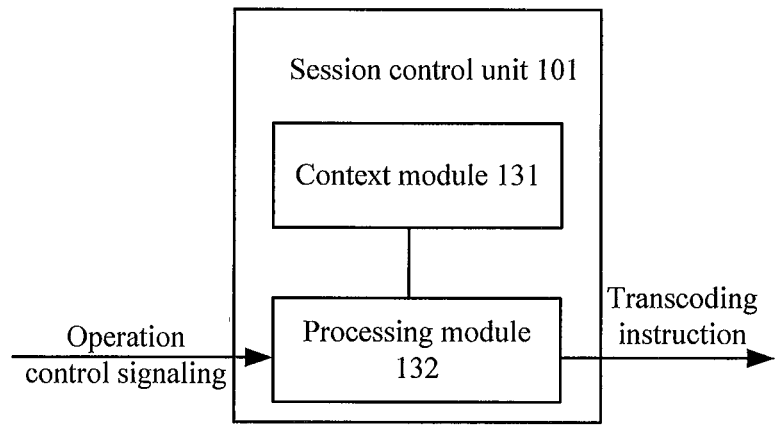
FIG. 2 is a schematic block diagram of an example of a session control unit shown in FIG. 1.

Optionally, in another embodiment, the session control unit 101 may further consider context information while computing the updated transcoding parameter. FIG. 2 is a schematic block diagram of an example of the session control unit 101 shown in FIG. 1. As shown in FIG. 2, the session control unit 101 includes a context module 131 and a processing module 132.

The context module 131 may store the context information, where the context information includes a position parameter and/or a scale parameter of a current video image. The current video image refers to a video image that is currently played on the user proxy, and the original video image is a video image sent by the video source.

The position parameter is used to indicate a position of the current video image, for example, a position relative to a playback window of the user proxy. A non-restrictive example of the position parameter is a horizontal-coordinate and a vertical-coordinate of a start point (for example, but not limited to, a point in an upper right corner of the current video image) of the current video image on the playback window, or may also be another coordinate form, which is not limited in the present invention. If the start point of the currently played image is fixed to a certain point on the playback window, for example, the upper left corner of the playback window (generally the origin of coordinates on the playback window), the position parameter may be omitted in the context information.

The scale parameter is used to indicate a scale of the current video image, for example, a scale relative to the original video image or a scale relative to the playback window of the user proxy. A non-restrictive example of the position parameter is a width zoom percentage (a value in a horizontal-coordinate direction) and a height zoom scale (a value in a vertical-coordinate direction) of the current video image. However, the embodiment of the present invention does not limit a form of the scale parameter. The position parameter may also be a scale value in another form, for example, a percentage value when the width to height ratio is fixed. If the scale of the currently played image is fixed to a value, for example, 100%, the scale parameter may be omitted in the context information.

The processing module 132 may compute the updated transcoding parameter according to the operation type included in the operation control signaling and the context information stored in the context module 131, or according to the operation type and the operation parameter that are included in the operation control signaling and the context information stored in the context module 131, and generate the transcoding instruction that includes the updated transcoding parameter.

In this way, the session control unit 101 can parse the operation, and compute the updated transcoding parameter according to the operation and the context information. The session control unit 101 schedules the transcoding unit 102 by using the transcoding instruction and instructs the transcoding unit 102 to execute a corresponding transcoding operation. Herein, the embodiment of the present invention does not limit that all transcoding instructions need to be generated according to the context information. For example, some operations (such as an Init operation exemplified in Table 1 below) may not require the context information.

Optionally, in another embodiment, the context information stored in the context module 131 may also include a size parameter of a playback window on the user proxy and/or a size parameter of the original video image. The size parameters are generally fixed. Storing the size parameters may accelerate the processing of the processing module 132. For example, the size parameter of the playback window may be a width and height of the window, and the size parameter of the original video image may be a width and height of the image. However, the embodiment of the present invention does not limit specific forms of the size parameters. For example, the size parameter may be coordinates of two end points of a diagonal line or a length of a diagonal line.

In another aspect, the context module 131 may further update the context information by using a result of the current operation, so that the context information remains consistent with the current video image. For example, the context module 131 may add a corresponding parameter generated by the operation indicated by the current operation control signaling to the context information, or replace a corresponding parameter that is previously stored with the corresponding parameter generated by the operation indicated by the current operation control signaling to the context information. When the context module 131 stores parameters generated by multiple historical operations, the operations can be more conveniently rolled back.

The following describes an example of computing an adjusted transcoding parameter according to context information and a current operation with reference to a specific embodiment.

In the embodiment of the present invention, a session control unit generates a transcoding instruction according to operation control signaling of a user proxy, so that a transcoding unit dynamically updates a transcoding parameter, thereby implementing dynamic transcoding on an original video as required, and improving operational flexibility of dynamic video adjustment.

In addition, the transcoding unit in the embodiment of the present invention may transcode and send only a partial video, thereby saving network resources and computing resources.

Figure 3:
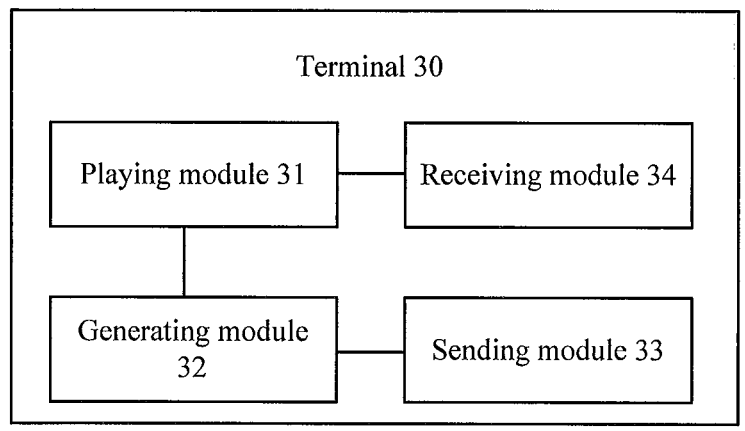
FIG. 3 is a block diagram of a terminal according to an embodiment of the present invention.

FIG. 3 is a block diagram of a terminal for dynamically adjusting a video according to an embodiment of the present invention. A terminal 30 shown in FIG. 3 includes a playing module 31, a generating module 32, a sending module 33, and a receiving module 34. The playing module 31, the generating module 32, the sending module 33, and the receiving module 34 may also be combined into the foregoing user proxy. The terminal 30 may be used as a part of the system 100 in FIG. 1. For example, the terminal 30 may communicate with the session control unit 101 and the transcoding unit 102 of the system 100; or, the terminal 30 may include the session control unit 101 of the system 100, and communicate with the transcoding unit 101 on a network side. The following describes modules of the terminal 30 with reference to the system 100 shown in FIG. 1, and therefore repeated descriptions are omitted as appropriate.

The playing module 31 plays a video image received from the transcoding unit 102. The generating module 32 generates operation control signaling in a video playing process, where the operation control signaling includes an operation type of an operation executed on the video image or the operation type of the operation and an operation parameter.

The sending module 33 sends the operation control signaling to the session control unit 101, so that the session control unit 101 generates a transcoding instruction according to the operation control signaling and sends the transcoding instruction to the transcoding unit 102, where the transcoding instruction includes an updated transcoding parameter, so that the transcoding unit 102 transcodes, according to the updated transcoding parameter, an original video image received from a video source so as to generate a transcoded video image.

The receiving module 34 receives the transcoded video image from the transcoding unit 102, and the playing module 31 plays the transcoded video image.

When the terminal in the embodiment of the present invention needs to perform an operation on the video image, the terminal does not perform local processing but sends the operation control signaling to the session control unit, so that the session control unit updates the transcoding parameter of the transcoding unit, and therefore the transcoding unit completes video adjustment processing. In this way, operational flexibility of dynamic video adjustment can be improved. In addition, in the embodiment of the present invention, computing resources of the terminal and resources required for network transmission can be saved.

The embodiment of the present invention does not limit a specific form of the terminal 30. For example, the terminal 30 may be a mobile terminal or a fixed terminal, and the like, that may communicate with the network side in a wireless or wired manner, such as a mobile phone (or called a "cellular" phone) and a computer. For example, the terminal 30 may also be a portable, compact, handheld, or computer-embedded apparatus or a vehicle-mounted apparatus.

Optionally, in an embodiment, the generating module 32 may generate the operation control signaling according to the operation performed by a user on the video image in a video playing process; or, the operation control signaling may be preset, and triggered as scheduled by the generating module 32 or triggered by an event. For example, the operation control signaling may include the operation type (such as Zoom, Move, and Fill) of the operation, or include the operation type of the operation and an operation parameter (if any operation parameter exists). The following further describes in detail examples of some operation types and corresponding operation parameters (if the operation type has any operation parameter) that are included in the operation control signaling with reference to an embodiment of Table 1. However, it should be noted that the embodiment of Table 1 is only exemplary and does not limit the scope of the embodiment of the present invention.

For example, a user may configure an operation on the video picture, such as Zoom, Move, or Part Zoom, by using a mouse, a keyboard, a touch screen, or a handwriting pen, to operate a button, a menu, or a screen of the software. In another aspect, the user may configure an operation on the video picture, such as Zoom, Move, or Part Zoom, by using a remote controller, a key, an intelligent sensing input device, or an operation decoder. The generating module 32 generates corresponding operation control signaling so as to indicate the operation. The following further describes in more details an example of an operation executed on a video image with reference to a specific embodiment.

Optionally, in an embodiment, the operation type included in the operation control signaling may be an Init operation, and the operation parameter included in the operation control signaling may be a size parameter of a playback window on the user proxy (such as the playing module 31 of the user proxy), a size parameter of an original video image, or a position parameter of the original video image on the playback window. The size parameter of the playback window may be a width and height of the playback window. For example, pixels are used as unit to indicate a resolution of the playback window. The size parameter of the original video image may be a width and height of the original video image. For example, pixels are used as unit to indicate a resolution of the original video image. The position parameter of the original video image on the playback window may be coordinates of a point (for example, a start point in the upper left corner) in the original video image on the playback window. However, the embodiment of the present invention does not limit a specific form of the parameter.

Alternatively, the operation type included in the operation control signaling may be a Zoom operation, and the operation parameter included in the operation control signaling may be a scale parameter of a zoomed-in/out video image relative to the original video image, for example, a width zoom scale in percentage and a height zoom scale in percentage. However, the embodiment of the present invention does not limit a specific form of the parameter.

Alternatively, the operation type included in the operation control signaling may be a Move operation, and the operation parameter included in the operation control signaling may be a deviation size parameter of a roamed video image to the original video image. Move is an operation that moves a played video image within the playback window, for example, translation of an image in different directions along with the mouse of the user. The deviation size parameter may be a distance that an image moves, for example, a length (may be a positive value, a negative value, or zero) for moving along the horizontal-coordinate or a length (may be a positive value, a negative value, or zero) for moving along the vertical-coordinate. However, the embodiment of the present invention does not limit a specific form of the parameter.

Alternatively, the operation type included in the operation control signaling may be a Part Zoom operation, and the operation parameter included in the operation control signaling may be a size parameter, a position parameter, and a scale parameter of a partial-zooming target area. Part Zoom is an operation that zooms in or out a partial video image (that is, the video image in the partial-zooming target area). The size parameter of the partial-zooming target area may be a width and height of the area, for example, the width and height in unit of pixels. The position parameter of the partial-zooming target area may be coordinates of a point (for example, a start point in the upper left corner) in the area on the playback window. The scale parameter of the partial-zooming target area may be a zoom scale in percentage of the area. However, the embodiment of the present invention does not limit a specific form of the parameter. For example, the scale parameter of the partial-zooming target area may also be a width and height of a corresponding zoomed-in/out area.

Alternatively, the operation type included in the operation control signaling may be a StopPartZoom operation. The StopPartZoom operation is an operation that stops the Part Zoom operation and may recover playing of the original video image or the video image on which the Part Zoom operation has not been performed. The StopPartZoom operation may not require any operation parameter. If the video image on which the Part Zoom operation has not been performed needs to be recovered, the operation control signaling may include the operation parameter related to the video image on which the Part Zoom operation has not been performed.

Alternatively, the operation type included in the operation control signaling may be a MakeCenter operation. The MakeCenter operation is an operation that puts the played video image in the middle of the playback window. The MakeCenter operation may not require any operation parameter, or may also include another operation parameter as required, which is not limited in the present invention.

Alternatively, the operation type included in the operation control signaling may be a FullScreen operation. The FullScreen operation is an operation that fills the entire playback window with the played video image. The FullScreen operation may not require any operation parameter, or may also include another operation parameter as required, which is not limited in the present invention.

However, the embodiment of the present invention is not limited to the foregoing specific examples, and the exemplified operations may be added, deleted, or replaced as required. For example, some even more complicated operations (such as superimposing of multiple partial videos or superimposing of one or more partial videos over a complete video) and corresponding parameters may be added. All the modifications shall fall within the scope of the embodiment of the present invention.

Figure 4:
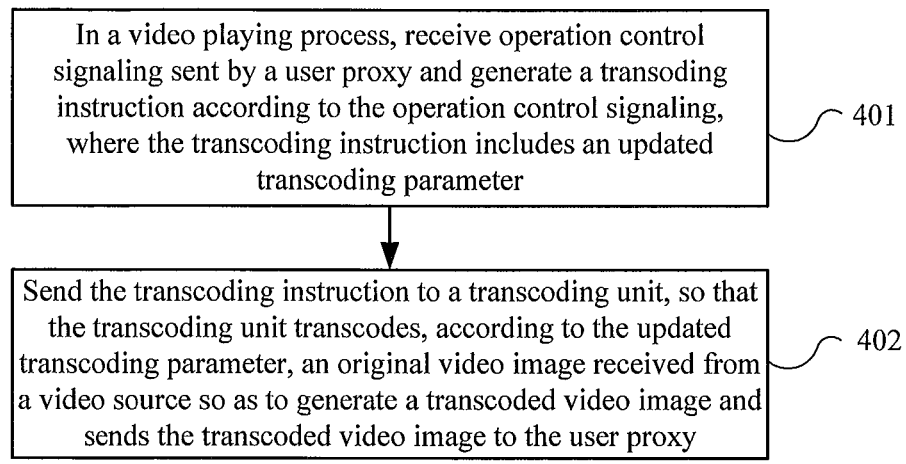
FIG. 4 is a flowchart of a method for dynamically adjusting a video according to an embodiment of the present invention.

FIG. 4 is a flowchart of a method for dynamically adjusting a video according to an embodiment of the present invention. The following describes the method shown in FIG. 4 with reference to the system 100 shown in FIG. 1, and therefore repeated descriptions are omitted as appropriate.

401: In a video playing process, the session control unit 101 receives operation control signaling sent by a user proxy, and generates a transcoding instruction according to the operation control signaling, where the transcoding instruction includes an updated transcoding parameter.

402: The session control unit 101 sends the transcoding instruction to the transcoding unit 102, so that the transcoding unit 102 transcodes, according to the updated transcoding parameter, an original video image received from a video source so as to generate a transcoded video image, and sends the transcoded video image to the user proxy.

In the embodiment of the present invention, a session control unit generates a transcoding instruction according to operation control signaling of a user proxy, so that a transcoding unit dynamically updates a transcoding parameter, thereby implementing dynamic transcoding on an original video as required, and improving operational flexibility of dynamic video adjustment.

In addition, in the embodiment of the present invention, a terminal does no need to perform local adjustment on the video image, thereby saving computing resources of the terminal. In the embodiment of the present invention, computing resources of the transcoding unit and network resources required for video transmission can also be saved.

Optionally, in an embodiment, in step 301, the updated transcoding parameter can be computed according to an operation type included in the operation control signaling or according to the operation type and an operation parameter that are included in the operation control signaling, and a transcoding instruction that includes the updated transcoding parameter can be generated.

Optionally, in another embodiment, in step 301, the updated transcoding parameter can be computed according to the operation type included in the operation control signaling and context information or according to the operation type and the operation parameter that are included in the operation control signaling and the context information, where the context information includes a position parameter and/or a scale parameter of a current video image.

Optionally, in another embodiment, the context information may further include a size parameter of a playback window on the user proxy and/or a size parameter of the original video image.

Optionally, in another embodiment, the updated transcoding parameter may include a position parameter of a partial video image. The transcoding unit may capture a partial video image from the original video image according to the position parameter of the partial video image, and transcode the partial video image so as to generate a transcoded video image.

Optionally, in another embodiment, the updated transcoding parameter may further include a scale parameter of the partial video image. The transcoding unit may zoom in or out a captured partial video image according to the scale parameter of the partial video image, and transcode the zoomed-in/out partial video image so as to generate a transcoded video image.

Optionally, in another embodiment, when transcoding a zoomed-in/out partial video image so as to generate a transcoded video image, the transcoding unit may superimpose the zoomed-in/out partial video image over the original video image, and transcodes the superimposed video image so as to generate a transcoded video image.

Optionally, in another embodiment, the operation type included in the operation control signaling is an Init operation, and the operation parameter included in the operation control signaling is the size parameter of the playback window on the user proxy, the size parameter of the original video image, and a position parameter of the original video image on the playback window; or, the operation type included in the operation control signaling is a Zoom operation, and the operation parameter included in the operation control signaling is a scale parameter of a zoomed-in/out video image relative to the original video image; or, the operation type included in the operation control signaling is a Move operation, and the operation parameter included in the operation control signaling is a deviation size parameter of a roamed video image to the original video image; or, the operation type included in the operation control signaling is a Part Zoom operation, and the operation parameter included in the operation control signaling is a size parameter, a position parameter, and a scale parameter of a partial-zooming target area; or, the operation type included in the operation control signaling is a StopPartZoom operation; or, the operation type included in the operation control signaling is a MakeCenter operation; or, the operation type included in the operation control signaling is a FullScreen operation.

Figure 5:
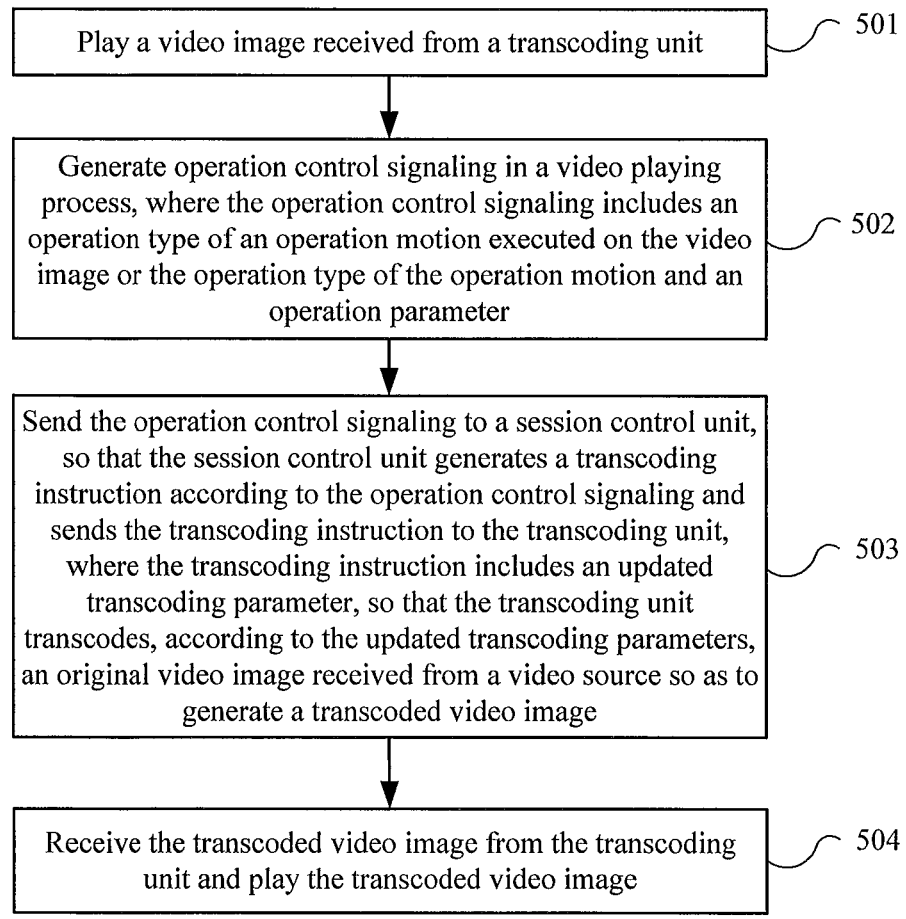
FIG. 5 is a flowchart of a method for dynamically adjusting a video according to another embodiment of the present invention.

FIG. 5 is a flowchart of a method for dynamically adjusting a video according to another embodiment of the present invention. The method shown in FIG. 5 may be executed by the terminal 30 shown in FIG. 3, and therefore repeated descriptions are omitted as appropriate.

501: Play a video image received from a transcoding unit.

502: Generate operation control signaling in a video playing process, where the operation control signaling includes an operation type of an operation executed on the video image or includes the operation type of the operation and an operation parameter.

503: Send the operation control signaling to a session control unit, so that the session control unit generates a transcoding instruction according to the operation control signaling and sends the transcoding instruction to the transcoding unit, where the transcoding instruction includes an updated transcoding parameter, so that the transcoding unit transcodes, according to the updated transcoding parameter, an original video image received from a video source so as to generate a transcoded video image.

504: Receive the transcoded video image from the transcoding unit, and play the transcoded video image.

When the terminal in the embodiment of the present invention needs to perform an operation on the video image, the terminal does not perform local processing but sends the operation control signaling to the session control unit, so that the session control unit updates the transcoding parameter of the transcoding unit, and therefore the transcoding unit completes video adjustment processing. In this way, operational flexibility of dynamic video adjustment can be improved. In addition, in the embodiment of the present invention, computing resources of the terminal and resources required for network transmission can be saved.

Optionally, in an embodiment, in step 502, the operation control signaling may be generated according to the operation performed by a user on the video image in a video playing process; or, the operation control signaling may be preset, and triggered as scheduled by the generating module 32 or triggered by an event.

Optionally, in another embodiment, the operation type included in the operation control signaling is an Init operation, and the operation parameter included in the operation control signaling is a size parameter of a playback window on a user proxy, a size parameter of the original video image, and a position parameter of the original video image on the playback window; or, the operation type included in the operation control signaling is a Zoom operation, and the operation parameter included in the operation control signaling is a scale parameter of a zoomed-in/out video image relative to the original video image; or, the operation type included in the operation control signaling is a Move operation, and the operation parameter included in the operation control signaling is a deviation size parameter of a roamed video image to the original video image; or, the operation type included in the operation control signaling is a Part Zoom operation, and the operation parameter included in the operation control signaling is a size parameter, a position parameter, and a scale parameter of a partial-zooming target area; or, the operation type included in the operation control signaling is a StopPartZoom operation; or, the operation type included in the operation control signaling is a Make-Center operation; or, the operation type included in the operation control signaling is a FullScreen operation.

Figure 6:
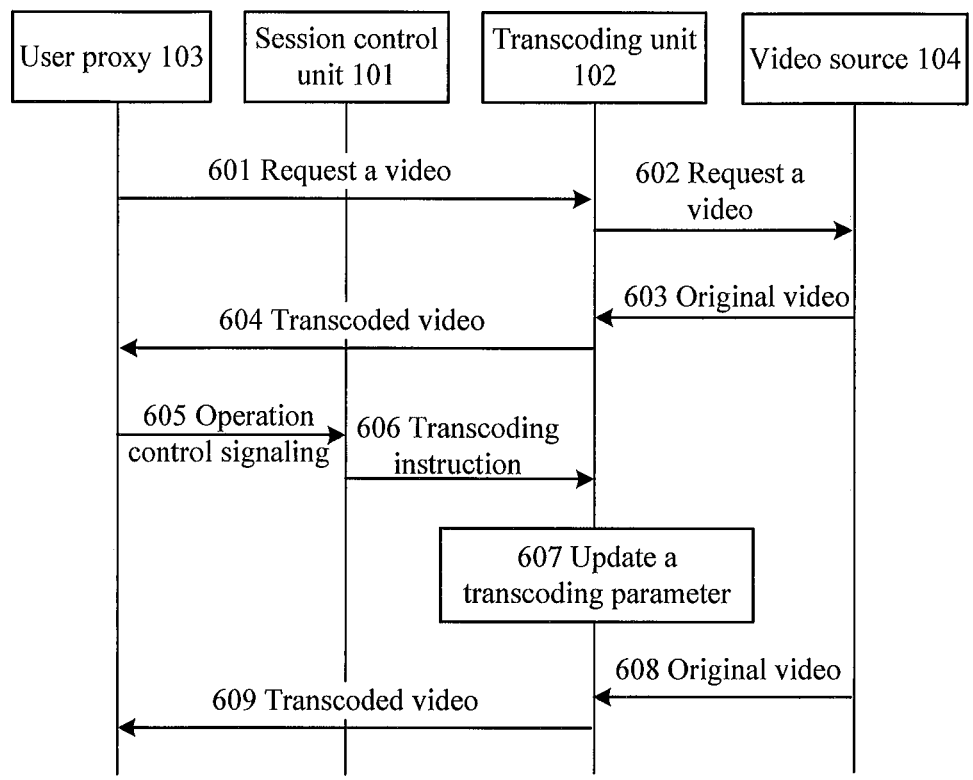
FIG. 6 is a schematic flowchart of a video playing process according to another embodiment of the present invention.

FIG. 6 is a schematic flowchart of a video playing process according to another embodiment of the present invention. In the embodiment illustrated in FIG. 6, tags that are the same as those in FIG. 1 are used to indicate same components. In addition, a user proxy 103 in FIG. 6 may be implemented on a terminal side, and a video source 104 is configured to store video content and send an original video to a transcoding unit 102 according to a request of the transcoding unit 102. The video source 104 may be any existing video source, and therefore no further details are provided herein.

601: The user proxy 103 requests a video from the transcoding unit 102.

602: The transcoding unit 102 requests the video from the video source 104 according to the request of the user proxy 103.

603: The video source 104 returns an original video image to the transcoding unit 102, where the original video image may be a real-time video, a videotape, a static image, and the like, which is not limited in the present invention.

For the manner of sending an original video image in step 603, reference may be made to the prior art, and therefore no further details are provided herein.

604: The transcoding unit 102 transcodes the original video image, and returns a video image of a resolution and a coding format that are suitable for the user proxy 103, so that the user proxy 103 plays the video image.

In step 604, a transcoding parameter used by the transcoding unit 102 may be a transcoding parameter that is not updated, or may also be a transcoding parameter that is updated for one or more times by using the method shown in FIG. 5, which is not limited in the present invention.

605: A user adjusts a playback area or a resolution in a playing process, or the user proxy 103 automatically adjusts the playback area or the resolution according to a user setting, and therefore the user proxy 103 sends operation control signaling to a session control unit 101, where the operation control signaling may indicate an operation.

606: The session control unit 101 converts the operation control signaling to a transcoding instruction according to an operation indicated by the operation control signaling and context information stored in the session control unit 101 (for example, context information stored in the context module 131 shown in FIG. 2), and sends the transcoding instruction to the transcoding unit 102.

607: The transcoding unit 102 updates a transcoding parameter according to an indication of the transcoding instruction.

608: The transcoding unit 102 continues to receive the original video image from the video source 104 and transcodes the received original video image according to the updated transcoding parameter.

609: The transcoding unit 102 sends the video image that is transcoded in step 608 to the user proxy 103, so that the user proxy 103 plays the video image.

After that, if any other operation needs to be performed, steps 605-609 may be repeated.

A conventional transcoding unit can transcode only a complete video, and therefore can send only the complete video to the user proxy. In this case, if a user only needs to view part of a video, the transcoding unit still needs to process the complete video and send the complete video to the user proxy. This wastes computing resources of the transcoding unit and occupies network resources.

The transcoding parameter of the transcoding unit 102 in the embodiment of the present invention may be flexibly updated and only a part of the video may be processed, thereby saving the computing resources of the transcoding unit 102. For example, if the user needs to enlarge a part of a video image, the transcoding unit 102 may process only the part of the video image and does not process other parts other than the part of the video image, thereby saving the computing resources.

In addition, the transcoding unit 102 in the embodiment of the present invention transmits only the transcoded video image but does not need to transmit the complete video, thereby saving the network resources. For example, if the user needs to superimpose a smaller image B over image A, the transcoding unit 102 may not process a part of image A that is blocked by image B, thereby saving the computing resources. Meanwhile, the transcoding unit 102 may not transmit the part of image A that is blocked by image B, thereby saving the network resources.

If the conventional terminal needs to process a video image on a local playback window, such as zooming in or out the video image on a local playback window, the computing resources, such as coding and decoding, of the user proxy on the terminal need to be occupied. The transcoding unit 101 in the embodiment of the present invention is responsible for transcoding of the video image, and local adjustment processing by the user proxy 103 is not required, thereby saving the computing resource of the terminal.

The following describes in more details the embodiment of the present invention with reference to specific examples. It should be noted that the examples are intended to help a person skilled in the art better understand the embodiment of the present invention, but not intended to limit the scope of the embodiment of the present invention. A person skilled in the art can make modifications based on the examples, for example, using a piece of pseudo-code, another operation, or another parameter name. All such modifications shall fall within the scope of the embodiment of the present invention.

The following specific examples are described with reference to the flowchart shown in FIG. 6. There are many types of operations indicated by the operation control signaling and sent by the user proxy 103 to the session control unit 101. Different operation types correspond to different parameters and parameter descriptions, as shown in Table 1.

| Operation Type | Operation Parameter | Parameter Description |
| --- | --- | --- |
| Initialization (Init) | sWidth<br>sHeight | Resolution of a video image |
| | iWidth<br>iHeight | Resolution of a playback window |
| | pX<br>pY | Coordinates of a start point for playing a video image |
| Zooming (Zoom) | scaleWidth<br>scaleHeight | Zoom scale of a video image |
| Picture roaming (Move) | lengthX<br>lengthY | Moving distance. Movement in 8 directions can be supported. lengthX < 0 indicates moving to the right, lengthX > 0 indicates moving to the left, and lengthX = 0 indicates moving neither to the |

-continued

| Operation Type | Operation Parameter | Parameter Description |
| --- | --- | --- |
| | | right nor to the left. lengthY < 0 indicates moving downward, lengthY > 0 indicates moving upward, and lengthY = 0 indicates moving neither upward nor downward. |
| Partial zooming (Part Zoom) | W H | Size of a partial-zooming target area |
| | X Y | Starting coordinates of a partial-zooming target area |
| | wScale hScale | Partial-zooming scale |
| Stopping partial zooming (StopPartZoom) | NA | No parameter |
| Making playback position center (MakeCenter) | NA | No parameter |
| Full-screen filling (Fullscreen) | NA | No parameter |

The following gives examples of pieces of pseudo-code for the session control unit 101 to obtain transcoding instructions according to the operations listed in Table 1. However, the examples are intended to help a person skilled in the art better understand an implementation manner of the embodiment of the present invention, but not intended to limit the scope of the embodiment of the present invention. Apparently, a person skilled in the art may make equivalent modifications or changes according to the given examples of the piece of pseudo-code. All such modifications or changes shall fall within the scope of the embodiment of the present invention.

An example of a piece of pseudo-code for converting the Init operation into a transcoding instruction is as follows:

```
Init(sWidth, sHeight, iWidth, iHeight)
{
Context. ScreenWidth = sWidth;
Context. ScreenHeight = sHeight;
Context. ImageWidth = iWidth;
Context. ImageHeight = iHeight;
Context. PositionX = 0;
Context. PositionY = 0;
Context. CurrentScaleWidth= iWidth/sWidth;
Context. CurrentScaleHeight= iHeight/sHeight;
Output. PositionX= 0;
Output. PositionY =0;
Output. ImageWidth = iWidth;
Output. ImageHeight = iHeight;
Output. ScaleWidth= iWidth/sWidth;
Output. ScaleHeight= iHeight/sHeight;
Context. Out[0]=output;
//Return a result
return Context. Out;
}
```

In the foregoing example, operation parameters of the Init operation, pX and pY, are fixed to 0 by default. The operation does not require context (Context) information, but the context information is updated. In the context information, Context. ScreenWidth indicates a width of the playback window on the user proxy, Context. ScreenHeigh indicates a height of the playback window on the user proxy, Context. ImageWidth indicates a width of the original video image, and Context. ImageHeight indicates a height of the original video image. After the Init operation is performed, the parameters are updated to the context information stored in the context module 131 shown in FIG. 2, and generally are parameters that are unchanged after the initialization.

Context. PositionX indicates a horizontal-coordinate of a position of the current video image on the playback window, Context. PositionY indicates a vertical-coordinate of the position of the current video image on the playback window, Context. CurrentScaleWidth indicates a width zoom scale in percentage of the current video image, and Context. CurrentScaleHeight indicates a height zoom scale in percentage of the current video image. The parameters are generated by the current operation, may vary with the operation, and may also be updated to the context information stored in the context module 131 shown in FIG. 2.

Context. Out[ ] indicates current output, and content in the current output is consistent with the context information. The current output is the transcoding instruction sent to the transcoding unit 102. The transcoding unit 102 needs to perform the transcoding operation according to the transcoding parameter indicated in Context. Out[ ]. For example, the transcoding unit 102 updates the starting coordinates of the video image as [0,0] according to Output. PositionX and Output. PositionY with reference to the foregoing piece of pseudo-code. The transcoding unit 102 sets a width of the video image to iWidth according to Output. ImageWidth, and sets a height of the video image to iHeight according to Output. ImageHeight. The transcoding unit 102 further sets a width zoom scale of the video image to iWidth/sWidth according to Output. ScaleWidth, and sets a height zoom scale of the video image to iHeight/sHeight according to Output. ScaleHeight. Definitions of other parameters are shown in Table 1. In the following pieces of pseudo-code, definitions of the same parameters are not repeated.

An example of a piece of pseudo-code for converting the Zoom operation into a transcoding instruction is as follows:

```
Output [ ] Zoom(scaleWidth, scaleHeight)
{
/*Calculate a zoomed-in/out current scale*/
Context. CurrentScaleWidth= Context. CurrentScaleWidth* scaleWidth;
Context. CurrentScaleHeight= Context. CurrentScaleHeight* scaleHeight;
/*Position of a zoomed-in/out video image on the playback
window: a central position of the zoomed-in/out video image remains
unchanged. The position of the zoomed-in/out video image on the
playback window refers to the position of the upper right corner
relative to the playback window. However, a case of <0 needs to be
considered. If the position is smaller than 0, the zoomed-in/out
position is set to 0. */
tempPositionX=Context. PositionX+( Context. ImageWidth/2* (scaleWidth−1));
tempPositionY= Context. PositionY+( Context. ImageHeight/2* (scaleHeight−1));
Context. PositionX = tempPositionX;     // Update the context
Context. PositionY = tempPositionY;   //Update the context
/*Corresponding position of the start point of the video
image before the video image is zoomed in or out. A video image is
captured by starting from this position*/
Output. PositionX= tempPositionX<0?0: tempPositionX; //If tempPositionX is smaller than 0, Output. PositionX is set to 0
Output. PositionX =Output. PositionX / Context. CurrentScaleWidth;
Output. PositionY= tempPositionY<0?0: tempPositionY; //If tempPositionY is smaller than 0, Output. PositionY is set to 0
Output. PositionY =Output. PositionY / Context. CurrentScaleHeight;
/*Area in which a video image is displayed on the actual playback window
```

-continued

```
    Note that the calculation is performed by using the size of
the playback window herein.*/
        AfterScaleImageWidth=  Context.  ImageWidth*  Context.
CurrentScaleWidth;
        AfterScaleImageHeight= Context. ImageHeight * Context.
CurrentScaleHeight;
        ScreenFillWidth= tempPositionX>0? AfterScaleImageWidth –
tempPositionX: AfterScaleImageWidth;
        ScreenFillHeight= tempPositionY>0? AfterScaleImageHeight –
tempPositionY: AfterScaleImageHeight;
        ScreenFillWidth= ScreenFillWidth> Context. ScreenWidth?
Context. ScreenWidth: ScreenFillWidth;
        ScreenFillHeight= ScreenFillWidth> Context. ScreenHeight?
Context. ScreenHeight: ScreenFillHeight;
        /*Calculate the size occupied by the zoomed-in/out video
image in the original video image
        Note that the calculation is performed by using the size of
the playback window herein.*/
        Output. ImageWidth  =  ScreenFillWidth  /  Context.
CurrentScaleWidth;
        Output. ImageHeight  =  ScreenFillHeight  /  Context.
CurrentScaleHeight;
        Output. ScaleWidth= Context. CurrentScaleWidth; //Zoom
scale
        Output. ScaleHeight= Context. CurrentScaleHeight;//Zoom
scale
        Context. Out[0]=output;
        //Return a result
        return Context. Out;
    }
```

Context. Out[ ] indicates current output, and content in the current output is consistent with the context information. The current output is the transcoding instruction sent to the transcoding unit 102. The transcoding unit 102 needs to perform the transcoding operation according to the transcoding parameter indicated in Context. Out[ ]. For example, the transcoding unit 102 updates the starting coordinates of the video image according to Output. PositionX and Output. PositionY with reference to the foregoing piece of pseudo-code. The transcoding unit 102 sets a width of the video image to ScreenFillWidth/Context. CurrentScaleWidth according to Output. ImageWidth, and sets a height of the video image to ScreenFillHeight/Context. CurrentScale-Height according to Output. ImageHeight. The transcoding unit 102 further sets a width zoom scale of the video image to Context. CurrentScaleWidth according to Output. ScaleWidth, and sets a height zoom scale of the video image to Context. CurrentScaleHeight according to Output. Scale-Height.

An example of a piece of pseudo-code for converting the Move operation into a transcoding instruction is as follows:

```
    Output[ ] Move(lengthX, lengthY)
    {
        tempPositionX= Context. PositionX+ lengthX;    //Move the
current image to the left and right
        tempPositionY= Context. PositionY+ lengthY;    //Move the
current image upward and downward
        Context. PositionX = tempPositionX;      //Update    the
context
        Context. PositionY = tempPositionY;      //Update    the
context
        /*Corresponding position of the start point of the video
image before the video image is zoomed in or out. A video image is
captured by starting from this position*/
        Output. PositionX= tempPositionX<0?0: tempPositionX; //If
tempPositionX is smaller than 0, Output. PositionX is set to 0
        Output. PositionX  =Output. PositionX / Context.
CurrentScaleWidth;
        Output. PositionY= tempPositionY<0?0: tempPositionY; //If
tempPositionY is smaller than 0, Output. PositionY is set to 0
        Output. PositionY =Output. PositionY / Context.
CurrentScaleHeight;
        /*Actual area in which a video image is displayed on the
playback window. Note that the calculation is performed by using the
size of the playback window, the size of the zoomed-in/out video image,
and a deviation position herein.*/
        AfterScaleImageWidth=  Context.  ImageWidth*  Context.
CurrentScaleWidth;
        AfterScaleImageHeight= Context. ImageHeight * Context.
CurrentScaleHeight;
        ScreenFillWidth= tempPositionX>0? AfterScaleImageWidth –
tempPositionX: AfterScaleImageWidth;
        ScreenFillHeight= tempPositionY>0? AfterScaleImageHeight –
tempPositionY: AfterScaleImageHeight;
        ScreenFillWidth= ScreenFillWidth> Context. ScreenWidth?
Context. ScreenWidth: ScreenFillWidth;
        ScreenFillHeight= ScreenFillWidth> Context. ScreenHeight?
Context. ScreenHeight: ScreenFillHeight;
        /*Calculate the size occupied by the zoomed-in/out video
image in the original video image
        Note that the calculation is performed by using the size of
the playback window herein.*/
        Output. ImageWidth  =  ScreenFillWidth  /  Context.
CurrentScaleWidth;
        Output. ImageHeight  =  ScreenFillHeight  /  Context.
CurrentScaleHeight;
        Output. ScaleWidth= Context. CurrentScaleWidth; //Zoom
scale
        Output. ScaleHeight= Context. CurrentScaleHeight;//Zoom
scale
        Context. Out [0]=output;
        //Return a result
        return Context. Out;
    }
```

Context. Out[ ] indicates current output, and content in the current output is consistent with the context information. The current output is the transcoding instruction sent to the transcoding unit 102. The transcoding unit 102 needs to perform the transcoding operation according to the transcoding parameter indicated in Context. Out[ ]. For example, the transcoding unit 102 updates the starting coordinates of the video image according to Output. PositionX and Output. PositionY with reference to the foregoing piece of pseudo-code. The transcoding unit 102 sets a width of the video image to ScreenFillWidth/Context. CurrentScaleWidth according to Output. ImageWidth, and sets a height of the video image to ScreenFillHeight/Context CurrentScale-Height according to Output. ImageHeight. The transcoding unit 102 further sets a width zoom scale of the video image to Context. CurrentScaleWidth according to Output. ScaleWidth, and sets a height zoom scale of the video image to Context. CurrentScaleHeight according to Output. Scale-Height.

An example of a piece of pseudo-code for converting the Part Zoom operation into a transcoding instruction is as follows:

```
    Output[ ] PartZoom(x,y,w,h,wScale,hScale)
    {
        /*Calculate a zoomed-in/out current scale*/
        Output2. ScaleWidth= Context. CurrentScaleWidth* wScale;
        Output2. ScaleHeight= Context. CurrentScaleHeight*hScale;
        /*Position of a partial zoomed-in/out video image on the
playback window: a central position of the zoomed-in/out video image
remains unchanged. The position of the zoomed-in/out video image on
the playback window refers to the position of the upper right corner
relative to the playback window. However, a case of <0 needs be
considered. If the position is smaller than 0, the zoomed-in/out
position is set to 0. */
        tempPositionX= x+( w/2* (Output2. ScaleWidth –1));
        tempPositionY=y+( h/2* (Output2. ScaleHeight –1));
```

-continued

```
/*Corresponding position of the start point of the video
image before the video image is zoomed in or out. A video image is
captured by starting from this position*/
    Output2. PositionX= tempPositionX<0?0: tempPositionX;
//If tempPositionX is smaller than 0, Output2. PositionX is set to
0
    Output2. PositionX =Output2. PositionX / Output2.
ScaleWidth;
    Output2. PositionY= tempPositionY<0?0: tempPositionY;
//If tempPositionY is smaller than 0, Output2. PositionY is set to
0
    Output2. PositionY =Output2. PositionY / Output2.
ScaleHeight;
    /*Area in which a video image is displayed on the actual
playback window
    Note that the calculation is performed by using the size of
the playback window herein.*/
    AfterScaleImageWidth= w* Output2. ScaleWidth;
    AfterScaleImageHeight= h* Output2. ScaleHeight;
    ScreenFillWidth= tempPositionX>0? AfterScaleImageWidth −
tempPositionX: AfterScaleImageWidth;
    ScreenFillHeight= tempPositionY>0? AfterScaleImageHeight −
tempPositionY: AfterScaleImageHeight;
    ScreenFillWidth= ScreenFillWidth> Context. ScreenWidth?
Context. ScreenWidth: ScreenFillWidth;
    ScreenFillHeight= ScreenFillHeight> Context. ScreenHeight?
Context. ScreenHeight: ScreenFillHeight;
    /*Calculate the size occupied by the zoomed-in/out video
image in the original video image
    Note that the calculation is performed by using the size of
the playback window herein.*/
    Output2. ImageWidth = ScreenFillWidth / Output2. ScaleWidth;
    Output2. ImageHeight = ScreenFillHeight / Output2.
ScaleHeight;
    Context. Out[1]=output2;
    //Return a result
    return Context. Out;
}
```

Context. Out[ ] indicates current output, and content in the current output is consistent with the context information. The current output is the transcoding instruction sent to the transcoding unit 102. The transcoding unit 102 needs to perform the transcoding operation according to the transcoding parameter indicated in Context. Out[ ]. For example, the transcoding unit 102 updates the starting coordinates of the video image according to Output2. PositionX and Output2. PositionY with reference to the foregoing piece of pseudo-code. The transcoding unit 102 sets a width of the video image to ScreenFillWidth/Output2. ScaleWidth according to Output2. ImageWidth, and sets a height of the video image to ScreenFillHeight/Output2. ScaleHeight according to Output. ImageHeight. The transcoding unit 102 further sets a width zoom scale of the video image to Context. CurrentScaleWidth*wScale according to Output2. ScaleWidth, and sets a height zoom scale of the video image to Context. CurrentScaleHeight*hScale according to Output2. ScaleHeight.

An example of a piece of pseudo-code for converting the StopPartZoom operation into a transcoding instruction is as follows:

```
Output[ ] StopPartZoom( )
{
    Context. Out[1]=null;
    return Context. Out;
}
```

Context. Out[ ] indicates the current output. The current output is the transcoding instruction sent to the transcoding unit 102. The transcoding unit 102 stops the Part Zoom operation according to the transcoding instruction, for example, may recover the transcoding parameter to a transcoding parameter that is after the initialization.

An example of a piece of pseudo-code for converting the MakeCenter operation into a transcoding instruction is as follows:

```
Output[ ] MakeCenter( )
{
    AfterScaleImageWidth= Context. ImageWidth* Context.
CurrentScaleWidth;
    AfterScaleImageHeight= Context. ImageHeight * Context.
CurrentScaleHeight;
    ScreenFillWidth=    AfterScaleImageWidth>    Context.
ScreenWidth? Context. ScreenWidth: AfterScaleImageWidth;
    ScreenFillHeight=    AfterScaleImageHeight>    Context.
ScreenHeight? Context. ScreenHeight: AfterScaleImageHeight;
    Context. PositionX  =  AfterScaleImageWidth  >  Context.
ScreenWidth?(AfterScaleImageWidth− Context. ScreenWidth)/2:0;
    Context. PositionY=  AfterScaleImageHeight  >  Context.
ScreenHeight?(AfterScaleImageHeight− Context. ScreenHeight)/2:0;
    Output. PositionX= Context . PositionX;
    Output. PositionY= Context . PositionY;
    Output.   ImageWidth=   ScreenFillWidth/   Context.
CurrentScaleWidth;
    Output.   ImageHeight=   ScreenFillHeight/   Context.
CurrentScaleHeight;
    Output. ScaleWidth= Context. CurrentScaleWidth;
    Output. ScaleHeight= Context. CurrentScaleHeight;
    Context. Out[0]= Output;
    return Context. Out;
}
```

Context. Out[ ] indicates current output, and content in the current output is consistent with the context information. The current output is the transcoding instruction sent to the transcoding unit 102. The transcoding unit 102 needs to perform the transcoding operation according to the transcoding parameter indicated in Context. Out[ ]. For example, the transcoding unit 102 updates the starting coordinates of the video image according to Output. PositionX and Output. PositionY with reference to the foregoing piece of pseudo-code. The transcoding unit 102 sets a width of the video image to ScreenFillWidth/Context. CurrentScaleWidth according to Output. ImageWidth, and sets a height of the video image to ScreenFillHeight/Context. CurrentScaleHeight according to Output. ImageHeight. The transcoding unit 102 further sets a width zoom scale of the video image to Context. CurrentScaleWidth according to Output. ScaleWidth, and sets a height zoom scale of the video image to Context. CurrentScaleHeight according to Output. ScaleHeight.

An example of a piece of pseudo-code for converting the FullScreen operation into a transcoding instruction is as follows:

```
Output[ ] FullScreen( )
{
    Context. PositionX = 0;
    Context. PositionY = 0;
    Context. CurrentScaleWidth= Context. ImageWidth / Context.
ScreenWidth;
    Context. CurrentScaleHeight= Context. ImageHeight / Context.
ScreenHeight;
    Output. PositionX= 0;
    Output. PositionY =0;
    Output. ImageWidth = Context. ImageWidth;
    Output. ImageHeight = Context. ImageHeight;
    Output. ScaleWidth= Context. CurrentScaleWidth;
    Output. ScaleHeight= Context. CurrentScaleHeight;
    Context. Out[0]=output;
```

```
//Return a result
return Context. Out;
}
```

Context. Out[ ] indicates current output, and content in the current output is consistent with the context information. The current output is the transcoding instruction sent to the transcoding unit 102. The transcoding unit 102 needs to perform the transcoding operation according to the transcoding parameter indicated in Context. Out[ ]. For example, the transcoding unit 102 updates the starting coordinates of the video image as [0,0] according to Output. PositionX and Output. PositionY with reference to the foregoing piece of pseudo-code. The transcoding unit 102 sets a width of the video image to Context. ImageWidth according to Output. ImageWidth, and sets a height of the video image to Context. ImageHeight according to Output. ImageHeight. The transcoding unit 102 further sets a width zoom scale of the video image to Context. CurrentScaleWidth according to Output. ScaleWidth, and sets a height zoom scale of the video image to Context. CurrentScaleHeight according to Output. ScaleHeight.

According to the foregoing example, the session control unit 101 finally generates the transcoding instruction Context. Out[ ]. The transcoding unit 102 updates the transcoding parameter according to the transcoding instruction, and performs transcoding according to the updated transcoding parameter.

The transcoding unit 102 performs processing, such as decoding, capturing, zooming in or out, partial zooming in, superimposing, and coding, on an original video received from the video source (for example, the video source 104 shown in FIG. 6), and generates a transcoded video. For example, the capturing, partial zooming in, and superimposing functions may be implemented by using the Part Zoom operation.

Specifically, during decoding, the transcoding unit 102 may decode a coded digital video into an image format that can be easily understood by a computer, for example, decode an H264 format to a YUV (luminance and color difference signal) or BMP (Bitmap, bitmap) format.

During capturing, the transcoding unit 102 may capture a partial video image that needs to be processed or output from a complete original video image. For example, the operation parameter wScale and hScale of the partial zooming may be set to 1, X and Y indicate the starting coordinates of the captured partial video image, and W and H indicate a width and height of the captured partial video image, respectively. If the complete original video image needs to be output, the entire video image is captured, that is, both X and Y are 0, and W and H are a width and height of the original video image, respectively.

During zooming in or out, the transcoding unit 102 may zoom in or out the captured image according to a certain scale, and in this case, the operation parameters wScale and hScale of the partial zooming may not be 1. During zooming in or out, generally an interpolation algorithm is used. If the partial zooming in is performed, other video images that are out of the area that is partially zoomed in may not be zoomed in or out or transmitted, so as to speed up computing and save the computing resources and network resources. In addition, during partial zooming in performed by the transcoding unit 102, the partial zooming in and zooming in or out of another video image may be executed in a parallel or serial manner.

During superimposing, the transcoding unit 102 may superimpose a video image that is partially zoomed in over another video image, that is, using pixels of the video image that is partially zoomed in to replace pixels at the corresponding position of the another video image. In this way, replaced pixels do not need to be transmitted, which can save the network resources.

During coding, the transcoding unit 102 codes a transcoded video picture into a digital video format that can be conveniently transmitted on a network, for example, codes the YUV or BMP format to the H264 or MPEG4 format. Then, the transcoding unit 102 may send the coded and transcoded video image to the user proxy 103.

The following gives an example of pieces of pseudo-code used by the transcoding unit 102 to perform transcoding. However, the example is intended to help a person skilled in the art better understand an implementation manner of the embodiment of the present invention, but not intended to limit the scope of the embodiment of the present invention. Apparently, a person skilled in the art may make equivalent modifications or changes according to the given example of the pieces of pseudo-code. All such modifications or changes shall fall within the scope of the embodiment of the present invention.

```
OutputStream Transfer(InputStream)
{
  Loop{
    Image dest=null;
    Image img=decode(InputStream. read);  //Decode a
received image.
    For(Output in Context. Out[ ])
    {
        Image subImg=cut(Img, Output); //Capture the image
according to a start position
        //Perform transcoding according to the zoom scale and
another parameter.
        Image transfedImg=transfer(subImg,Output,...);
        Dest=dest+ transfedImg; //Superimpose the image
    }
        OutputStream. write(encode(dest));  //Output the
transcoded image
    }
}
```

When capturing an image, the transcoding unit 102 may capture an corresponding image according to the starting coordinates (X,Y) and sizes (W,H) that are included in Output (transcoding instruction).

The user proxy 103 receives and plays the video transcoded by the transcoding unit 102. For example, the user proxy 103 may play received video on the playback window.

FIG. 7 to FIG. 11 are schematic diagrams of examples of video playing according to embodiments of the present invention. Examples in FIG. 7 to FIG. 11 are intended to explain only scenarios in which the embodiments of the present invention can be implemented, but not intended to limit the scope of the embodiments of the present invention. In the descriptions in FIG. 7 to FIG. 11, "playback area" refers to the part of a video image, which is located in the playback window.

Figure 7:
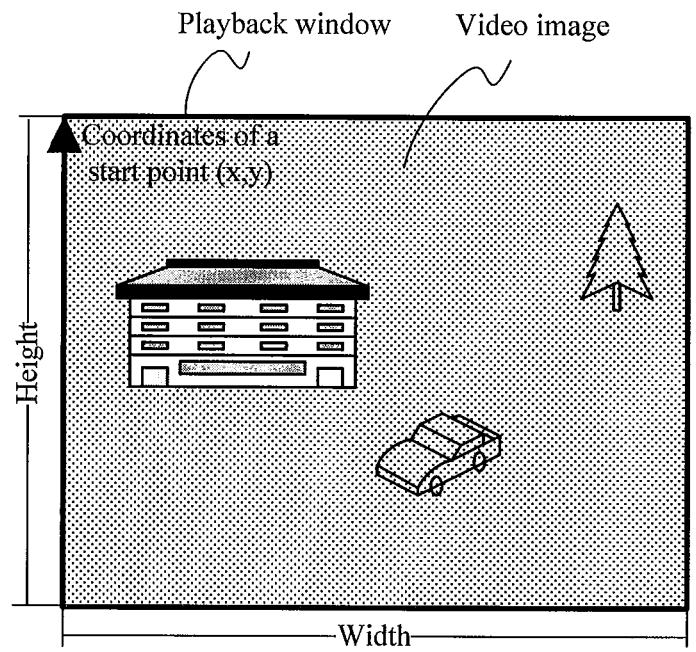
FIG. 7 shows an example of a completely filled video.

FIG. 7 shows an example of a completely filled video, which may be implemented by using the FullScreen operation. As shown in FIG. 7, a video image (a shadow part) fills exactly an entire playback window (a thick solid block). In this case, with reference to the foregoing piece of pseudo-code of the FullScreen operation, if a resolution of an original video image is higher than a resolution of the playback window, that is, Context. CurrentScaleWidth=Context. ImageWidth/Context. ScreenWidth>1 or Context. CurrentScaleHeight=Context. ImageHeight/Context. ScreenHeight>1, the transcoding unit 102 zooms out the original video according to the resolution of the playback window. The zoom scales are as follows: Output. ScaleWidth=Context. CurrentScaleWidth, and Output. ScaleHeight=Context. CurrentScaleHeight.

In another aspect, if the resolution of the original video image is lower than the resolution of the playback window, the transcoding unit 102 may transparently transmit the original video, and the user proxy 103 zooms in the original video; or, the FullScreen operation described in Table 1 may also be used, and the transcoding unit 102 zooms in the original video according to the resolution of the playback window; or, a combination of the two manners may also be used. A specific manner used is subject to a computing capability of the user proxy 103 and evaluation of the network bandwidth.

In FIG. 7, Width refers to the number of pixels occupied by a width of the playback area of the video image, and is a width of the playback window herein; and Height refers to the number of pixels occupied by a height of the playback area of the video image, and is a height of the playback window herein.

The starting coordinates (x,y) refer to a relative position of the video image in the playback area. Herein, (x,y) is (0,0).

Figure 8:
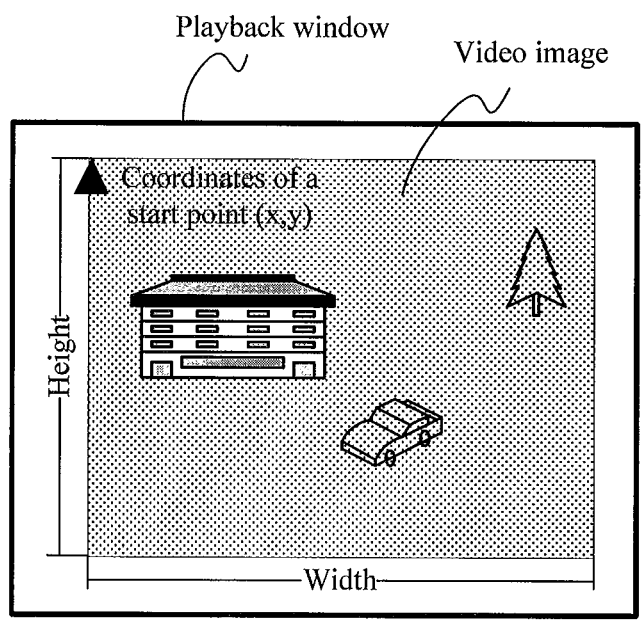
FIG. 8 shows an example of a partially filled video.

FIG. 8 shows an example of a partially filled video. In the example shown in FIG. 8, a video image (a shadow part) is smaller than a playback window (a thick solid block). The example shown in FIG. 8 may be implemented by using the Part Zoom operation, where a transcoding instruction requests the transcoding unit 102 to capture a complete original video image and zoom in or out the original video image to a size of an area of the shadow part (a playback area). Settings of corresponding parameters are not provided herein again.

In this case, if a resolution of the original video image is higher than a resolution of the playback area, the transcoding unit 102 zooms out the original video according to the resolution of the playback area. If the resolution of the original video image is lower than the resolution of the playback area, the transcoding unit 102 may transparently transmit the original video, and the user proxy 103 zooms in the original video; or, the transcoding unit 102 zooms in the original video according to the resolution of the playback window; or, the two manners may also be combined together. Which manner is specifically used is subject to a computing capability of the user proxy 103 and evaluation of the network bandwidth.

In FIG. 8, Width refers to the number of pixels occupied by a width of the playback area of the video image, and Height refers to the number of pixels occupied by a height of the playback area of the video image. The starting coordinates (x,y) refer to a relative position of the video image in the playback area. Herein, (x,y) is (0,0).

Figure 9:
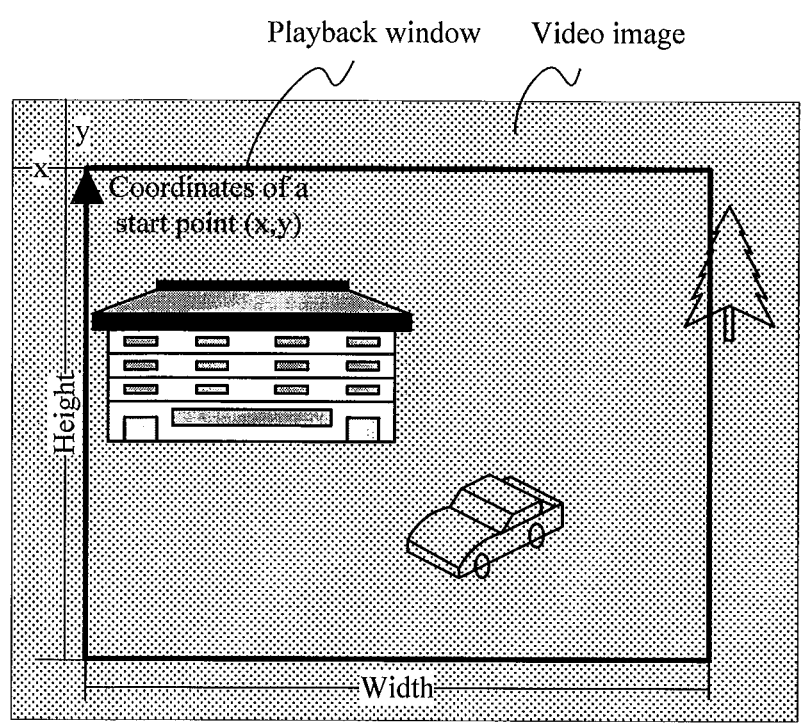
FIG. 9 shows an example in which a video image is out of a playback area.

FIG. 9 shows an example in which a video image is out of a playback area. In the example shown in FIG. 9, the playback area is the same as a playback window (the thick solid block) and partially playing and roaming of the video image (a shadow part) can be implemented. The example shown in FIG. 9 may be implemented by using the Move operation.

When the video image is zoomed in to a certain degree, the video image is out of the playback area. In this case, the user proxy 103 is allowed to play a part of the image (such as the image within the playback window shown in FIG. 9); and in a case where a resolution of the video image remains unchanged, move the image to play different parts, thereby implementing roaming of the video image.

In this case, if a resolution of the original video image is higher than a resolution of the playback area, the transcoding unit 102 captures the original video image according to the resolution of the playback area, discards images outside the playback area, and transcodes only the video image within the playback area.

In FIG. 9, Width refers to the number of pixels occupied by a width of the playback area of the video image, and Height refers to the number of pixels occupied by a height of the playback area of the video image. The starting coordinates (x,y) refer to a relative position of the video image in the playback area. Herein, for a value of (x,y), refer to FIG. 9.

Figure 10:
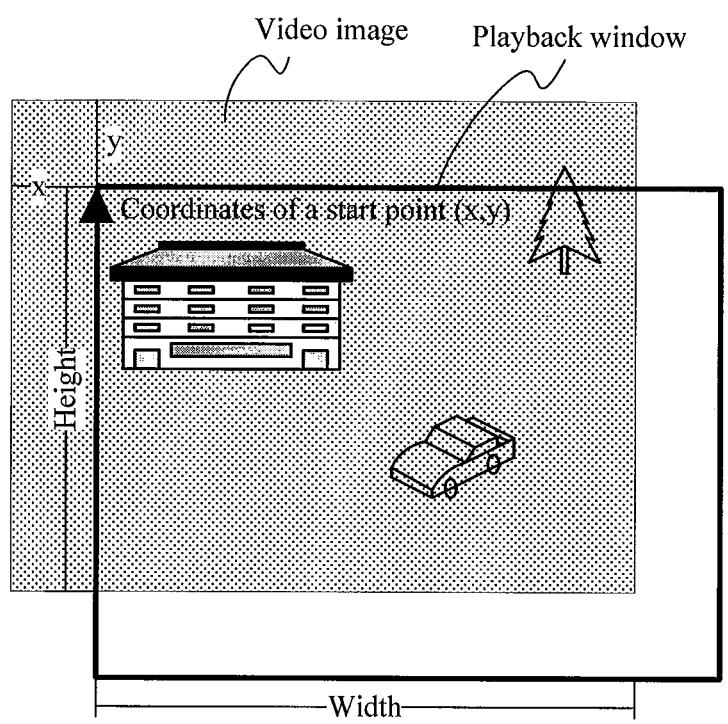
FIG. 10 shows an example of a partially filled video image.

FIG. 10 shows an example of a partially filled video image. In the example shown in FIG. 10, a playback area (a shadow part within the thick solid block) is smaller than a playback window (the thick solid block) and partially playing and roaming of the video image can also be implemented. The example shown in FIG. 10 may be implemented by using the Move operation.

The video image is allowed to be moved out of a playback area during roaming. In this case, if a resolution of an original video image is higher than a resolution of the playback area, the transcoding unit 102 captures the original video according to the resolution of the playback area, discards images outside the playback area, and transcodes only the video image within the playback area.

In FIG. 10, Width refers to the number of pixels occupied by a width of the playback area of the video image, and Height refers to the number of pixels occupied by a height of the playback area of the video image. The starting coordinates (x,y) refer to a relative position of the playback area in the complete video image. Herein, for a value of (x,y), refer to FIG. 9. If x<0, it is set that x=0; or, if y<0, it is set that y=0.

Figure 11A:
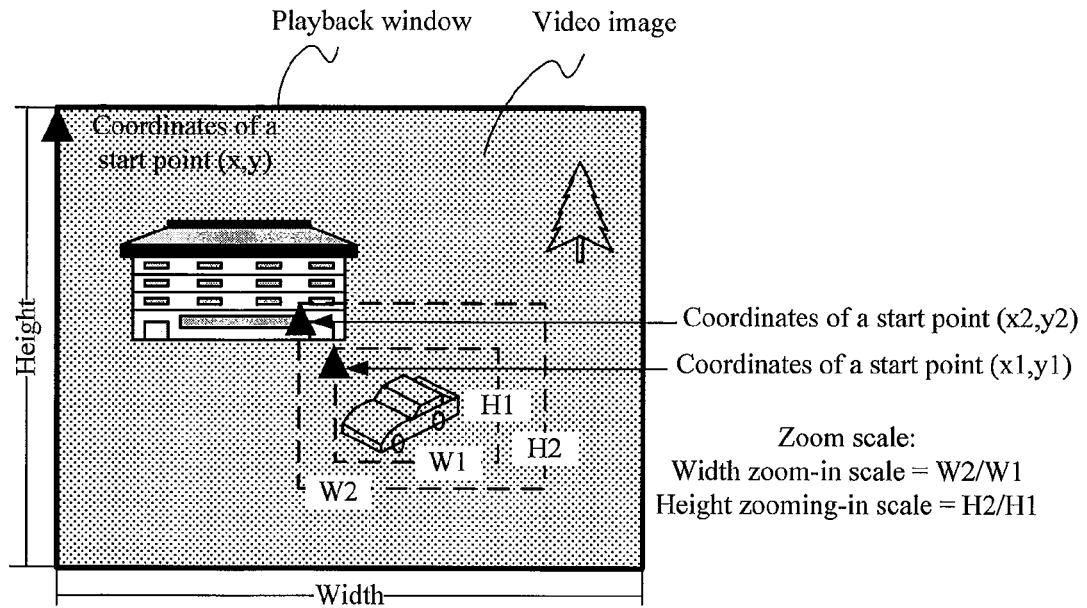
Figure 11B:
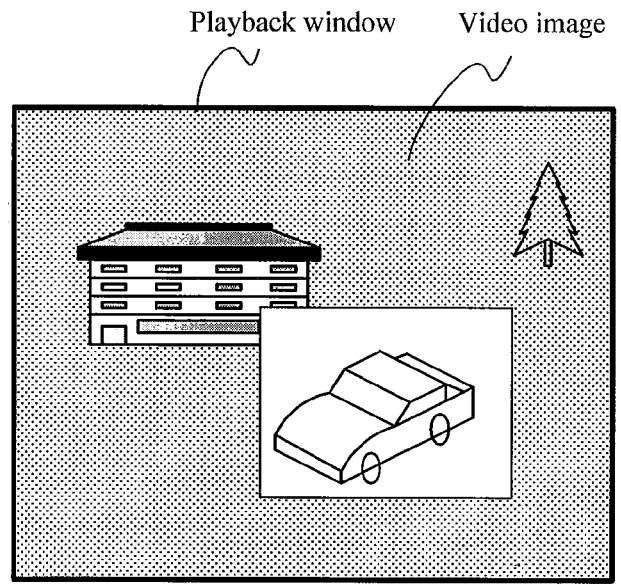

FIG. 11A and FIG. 11B show examples in which a video is partially zoomed in. FIG. 11A shows a video before it is partially zoomed in. Similar to FIG. 7, it is assumed that a video image (a shadow part) can fill exactly an entire playback window (the thick solid block).

Now, it is required that the video image within the dashed block indicated by W1-H1 (called "partial-zooming-in target area") to the dashed block indicated by W2-H2 (called "area after the partial zooming-in"). A width zooming-in scale is W2/W1, and a height zooming-in scale is H2/H1.

In a video playing process, a part of the video image is allowed to be zoomed in, for example, by using the Part Zoom operation. In this case, the transcoding unit 102 first transcodes an original video according to a resolution of a playback area. Then, the transcoding unit 102 transcodes the selected image in the partial-zooming-in target area according to specified scales (for example, the W2/W1 and the H2/H1). Finally, the transcoding unit 102 performs video superimposing for the two transcoding results. FIG. 11B shows a superimposed video image.

In addition, when transcoding the original video, the transcoding unit 102 may not execute transcoding on an area covered by W2-H2, because this area is later covered by W1-H1 that is zoomed in. This saves the computing resources of the transcoding unit 102.

In FIG. 11A and FIG. 11B, Width refers to the number of pixels occupied by a width of the playback area of the video image, and Height refers to the number of pixels occupied by a height of the playback area of the video image. W1 refers to the number of pixels occupied by a width of the partial-zooming-in target area, and H1 refers to the number of pixels occupied by a height of the partial-zooming-in target area. W2 refers to the number of pixels occupied by a width of the area after the partial zooming-in, and H1 refers to the number of pixels occupied by a height of the area after the partial zooming-in.

The starting coordinates (x,y) refer to a relative position of the video image in the playback area. Herein, (x,y) is (0,0). The starting coordinates (x1,y1) refer to a position of the partial-zooming-in target area relative to the playback area. The starting coordinates (x2,y2) are a position of the area after the partial zooming-in relative to the playback area.

In embodiments of the present invention, a session control unit generates a transcoding instruction according to operation control signaling of a user proxy, so that a transcoding unit dynamically updates a transcoding parameter, thereby implementing dynamic transcoding on an original video as required, and improving operational flexibility of dynamic video adjustment.

In addition, the transcoding unit in the embodiments of the present invention can transcode and transmit only a partial video, thereby saving network resources and computing resources.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the apparatus embodiment described above is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for dynamically adjusting a video, the method comprising:
   in a video playing process, receiving operation control signaling sent by a user proxy, and generating a transcoding instruction according to the operation control signaling, wherein the transcoding instruction comprises an updated transcoding parameter;
   sending the transcoding instruction to a transcoding unit, so that the transcoding unit transcodes, according to the updated transcoding parameter, an original video image received from a video source so as to generate a transcoded video image, and sends the transcoded video image to the user proxy;
   wherein generating a transcoding instruction according to the operation control signaling comprises:
      computing the updated transcoding parameter according to an operation type comprised in the operation control signaling or according to an operation type and an operation parameter that are comprised in the operation control signaling, and generating the transcoding instruction that comprises the updated transcoding parameter; and
   wherein computing the updated transcoding parameter according to an operation type and an operation parameter that are comprised in the operation control signaling comprises:
      computing the updated transcoding parameter according to the operation type comprised in the operation control signaling and context information or according to the operation type and the operation parameter that are comprised in the operation control signaling and context information, wherein the context information comprises a position parameter and/or a scale parameter of a current video image.

2. The method according to claim 1, wherein the context information further comprises a size parameter of a playback window on the user proxy and/or a size parameter of the original video image.

3. A method for dynamically adjusting a video, the method comprising:
in a video playing process, receiving operation control signaling sent by a user proxy, and generating a transcoding instruction according to the operation control signaling, wherein the transcoding instruction comprises an updated transcoding parameter;
sending the transcoding instruction to a transcoding unit, so that the transcoding unit transcodes, according to the updated transcoding parameter, an original video image received from a video source so as to generate a transcoded video image, and sends the transcoded video image to the user proxy, wherein the updated transcoding parameter comprises a position parameter of a partial video image; and
transcoding, by the transcoding unit, according to the updated transcoding parameter, an original video image received from a video source so as to generate a transcoded video image comprises:
capturing, by the transcoding unit, the partial video image from the original video image according to the position parameter of the partial video image, and transcoding the partial video image so as to generate the transcoded video image.

4. The method according to claim 3, wherein:
the updated transcoding parameter further comprises a scale parameter of the partial video image; and
transcoding, by the transcoding unit, the partial video image so as to generate the transcoded video image comprises:
zooming in or out, by the transcoding unit, the captured partial video image according to the scale parameter of the partial video image, and transcoding the zoomed-in/out partial video image so as to generate the transcoded video image.

5. The method according to claim 4, wherein transcoding, by the transcoding unit, the zoomed-in/out partial video image so as to generate the transcoded video image comprises:
superimposing, by the transcoding unit, the zoomed-in/out partial video image over the original video image, and transcoding the superimposed video image so as to generate the transcoded video image.

6. A method for dynamically adjusting a video, the method comprising:
in a video playing process, receiving operation control signaling sent by a user proxy, and generating a transcoding instruction according to the operation control signaling, wherein the transcoding instruction comprises an updated transcoding parameter; and
sending the transcoding instruction to a transcoding unit, so that the transcoding unit transcodes, according to the updated transcoding parameter, an original video image received from a video source so as to generate a transcoded video image, and sends the transcoded video image to the user proxy, wherein:
an operation type comprised in the operation control signaling is an Init operation, and an operation parameter comprised in the operation control signaling is a size parameter of a playback window on the user proxy, a size parameter of the original video image, and a position parameter of the original video image on the playback window; or
an operation type comprised in the operation control signaling is a Zoom operation, and an operation parameter comprised in the operation control signaling is a scale parameter of a zoomed-in/out video image relative to the original video image; or
an operation type comprised in the operation control signaling is a Move operation, and an operation parameter comprised in the operation control signaling is a deviation size parameter of a roamed video image relative to the original video image; or
an operation type comprised in the operation control signaling is a Part Zoom operation, and an operation parameter comprised in the operation control signaling is a size parameter, a position parameter, and a scale parameter of a partial-zooming target area; or
an operation type comprised in the operation control signaling is a StopPartZoom operation; or
an operation type comprised in the operation control signaling is a MakeCenter operation; or
an operation type comprised in the operation control signaling is a FullScreen operation.

7. A method for dynamically adjusting a video, the method comprising:
playing a video image received from a transcoding unit;
generating operation control signaling in a video playing process, wherein the operation control signaling comprises an operation type of an operation executed on the video image or comprises the operation type of the operation and an operation parameter;
sending the operation control signaling to a session control unit, so that the session control unit generates a transcoding instruction according to the operation control signaling and sends the transcoding instruction to the transcoding unit, wherein the transcoding instruction comprises an updated transcoding parameter, so that the transcoding unit transcodes, according to the updated transcoding parameter, an original video image received from a video source so as to generate a transcoded video image; and
receiving the transcoded video image from the transcoding unit, and playing the transcoded video image, wherein:
an operation type comprised in the operation control signaling is an Init operation, and an operation parameter comprised in the operation control signaling is a size parameter of a playback window on the user proxy, a size parameter of the original video image, and a position parameter of the original video image on the playback window; or
an operation type comprised in the operation control signaling is a Zoom operation, and an operation parameter comprised in the operation control signaling is a scale parameter of a zoomed-in/out video image relative to the original video image; or
an operation type comprised in the operation control signaling is a Move operation, and an operation parameter comprised in the operation control signaling is a deviation size parameter of a roamed video image relative to the original video image; or
an operation type comprised in the operation control signaling is a Part Zoom operation, and an operation parameter comprised in the operation control signaling is a size parameter, a position parameter, and a scale parameter of a partial-zooming target area; or
an operation type comprised in the operation control signaling is a StopPartZoom operation; or an operation type comprised in the operation control signaling is a MakeCenter operation; or an operation type comprised in the operation control signaling is a FullScreen operation.

8. A system for dynamically adjusting a video, the system comprising:

a session control unit, configured to: in a video playing process, receive operation control signaling sent by a user proxy, and generate a transcoding instruction according to the received operation control signaling, wherein the transcoding instruction comprises an updated transcoding parameter;

a transcoding unit, configured to receive the transcoding instruction sent by the session control unit, transcode, according to the updated transcoding parameter, an original video image received from a video source so as to generate a transcoded video image, and send the transcoded video image to the user proxy;

wherein the session control unit is configured to compute the updated transcoding parameter according to an operation type comprised in the operation control signaling or according to an operation type and an operation parameter that are comprised in the operation control signaling, and generate the transcoding instruction that comprises the updated transcoding parameter;

wherein the session control unit comprises:

a context module, configured to store context information, wherein the context information comprises a position parameter and/or a scale parameter of a current video image, and a processing module, configured to compute the updated transcoding parameter according to the operation type comprised in the operation control signaling and the context information stored in the context module, or according to the operation type and the operation parameter that are comprised in the operation control signaling and the context information stored in the context module, and generate the transcoding instruction that comprises the updated transcoding parameter.

9. The system according to claim 8, wherein the context information stored in the context module further comprises a size parameter of a playback window on the user proxy and/or a size parameter of the original video image.

10. A system for dynamically adjusting a video, the system comprising:

a session control unit, configured to: in a video playing process, receive operation control signaling sent by a user proxy, and generate a transcoding instruction according to the received operation control signaling, wherein the transcoding instruction comprises an updated transcoding parameter;

a transcoding unit, configured to receive the transcoding instruction sent by the session control unit, transcode, according to the updated transcoding parameter, an original video image received from a video source so as to generate a transcoded video image, and send the transcoded video image to the user proxy;

wherein the updated transcoding parameter comprises a position parameter of a partial video image; and wherein the transcoding unit is configured to capture the partial video image from the original video image according to the position parameter of the partial video image, and transcode the partial video image so as to generate the transcoded video image.

11. The system according to claim 10, wherein:

the updated transcoding parameter further comprises a scale parameter of the partial video image; and the transcoding unit is configured to zoom in or out the captured partial video image according to the scale parameter of the partial video image, and transcode the zoomed-in/out partial video image so as to generate the transcoded video image.

12. The system according to claim 11, wherein the transcoding unit is configured to superimpose the zoomed-in/out partial video image over the original video image, and transcode the superimposed video image so as to generate the transcoded video image.

13. A system for dynamically adjusting a video, the system comprising:

a session control unit, configured to: in a video playing process, receive operation control signaling sent by a user proxy, and generate a transcoding instruction according to the received operation control signaling, wherein the transcoding instruction comprises an updated transcoding parameter; and a transcoding unit, configured to receive the transcoding instruction sent by the session control unit, transcode, according to the updated transcoding parameter, an original video image received from a video source so as to generate a transcoded video image, and send the transcoded video image to the user proxy, wherein:

an operation type comprised in the operation control signaling is an Init operation, and an operation parameter comprised in the operation control signaling is a size parameter of a playback window on the user proxy, a size parameter of the original video image, and a position parameter of the original video image on the playback window; or an operation type comprised in the operation control signaling is a Zoom operation, and an operation parameter comprised in the operation control signaling is a scale parameter of a zoomed-in/out video image relative to the original video image; or an operation type comprised in the operation control signaling is a Move operation, and an operation parameter comprised in the operation control signaling is a deviation size parameter of a roamed video image relative to the original video image; or an operation type comprised in the operation control signaling is a Part Zoom operation, and an operation parameter comprised in the operation control signaling is a size parameter, a position parameter, and a scale parameter of a partial-zooming target area; or an operation type comprised in the operation control signaling is a StopPartZoom operation; or an operation type comprised in the operation control signaling is a MakeCenter operation; or an operation type comprised in the operation control signaling is a FullScreen operation.

14. A terminal for dynamically adjusting a video, the terminal comprising:

a playing module, configured to play a video image received from a transcoding unit;

a generating module, configured to generate operation control signaling in a video playing process, wherein the operation control signaling comprises an operation type of an operation executed on the video image or comprises the operation type of the operation and an operation parameter;

a sending module, configured to send the operation control signaling to a session control unit, so that the session control unit generates a transcoding instruction according to the operation control signaling and sends the transcoding instruction to the transcoding unit, wherein the transcoding instruction comprises an updated transcoding parameter, so that the transcoding unit transcodes, according to the updated transcoding parameter, an original video image received from a video source so as to generate a transcoded video image;

a receiving module, configured to receive the transcoded video image from the transcoding unit;

wherein the playing module is further configured to play the transcoded video image; and wherein:
an operation type comprised in the operation control signaling is an Init operation, and an operation parameter comprised in the operation control signaling is a size parameter of a playback window on the user proxy, a size parameter of the original video image, and a position parameter of the original video image on the playback window; or an operation type comprised in the operation control signaling is a Zoom operation, and an operation parameter comprised in the operation control signaling is a scale parameter of a zoomed-in/out video image relative to the original video image; or an operation type comprised in the operation control signaling is a Move operation, and an operation parameter comprised in the operation control signaling is a deviation size parameter of a roamed video image relative to the original video image; or an operation type comprised in the operation control signaling is a Part Zoom operation, and an operation parameter comprised in the operation control signaling is a size parameter, a position parameter, and a scale parameter of a partial-zooming target area; or an operation type comprised in the operation control signaling is a StopPartZoom operation; or an operation type comprised in the operation control signaling is a MakeCenter operation; or an operation type comprised in the operation control signaling is a FullScreen operation.

* * * * *